(12) United States Patent
Sakurai et al.

(10) Patent No.: US 7,527,238 B2
(45) Date of Patent: May 5, 2009

(54) PROTECTION STRUCTURE FOR ROD SEAL MEMBER OF TWO-PORT VALVE

(75) Inventors: Toyonobu Sakurai, Tsukubamirai (JP); Ikuo Kanzaka, Tsukubamirai (JP)

(73) Assignee: SMC Corporation, Chiyoda-ku, Tokyo (JP)

( * ) Notice: Subject to any disclaimer, the term of this patent is extended or adjusted under 35 U.S.C. 154(b) by 462 days.

(21) Appl. No.: 11/416,603

(22) Filed: May 3, 2006

(65) Prior Publication Data

US 2007/0034822 A1 Feb. 15, 2007

(30) Foreign Application Priority Data

May 9, 2005 (JP) .............................. 2005-136208

(51) Int. Cl.
*F16K 31/00* (2006.01)
(52) U.S. Cl. ........................................ 251/63.6; 251/62
(58) Field of Classification Search ................ 251/330, 251/333, 62, 63.5, 63.6
See application file for complete search history.

(56) References Cited

U.S. PATENT DOCUMENTS

| | | | | |
|---|---|---|---|---|
| 534,228 A * | 2/1895 | Pierce | ........................ | 251/142 |
| 774,985 A * | 11/1904 | Jones | ........................ | 251/273 |
| 1,638,162 A * | 8/1927 | Kirschbraun et al. | .......... | 251/86 |
| 2,253,372 A * | 8/1941 | Fischer | ....................... | 137/327 |
| 2,583,291 A * | 1/1952 | Beem | ......................... | 251/215 |
| 2,934,307 A * | 4/1960 | Henderson | ................... | 251/41 |
| 3,123,092 A * | 3/1964 | Kmiecik et al. | ............. | 137/469 |
| 3,810,485 A * | 5/1974 | Gawlick et al. | ............... | 137/71 |
| 4,540,013 A * | 9/1985 | Furley et al. | ................... | 137/75 |
| 4,840,347 A * | 6/1989 | Ariizumi et al. | ............ | 251/63.4 |
| 4,903,939 A * | 2/1990 | Ariizumi et al. | ............ | 251/63.4 |
| 4,991,619 A * | 2/1991 | della Porta | ................... | 137/240 |
| 5,014,738 A * | 5/1991 | Jones | ............................ | 137/340 |
| 5,305,788 A * | 4/1994 | Mayeux | ........................ | 137/583 |
| 6,321,780 B1 * | 11/2001 | Iwabuchi | ...................... | 137/341 |
| 6,581,635 B2 * | 6/2003 | Furutate et al. | .............. | 137/556 |
| 6,668,854 B2 * | 12/2003 | Fukuda | ......................... | 137/341 |
| 6,814,338 B2 * | 11/2004 | Kajitani | ...................... | 251/63.6 |
| 6,877,715 B2 * | 4/2005 | Kajitani | ...................... | 251/63.5 |
| 7,357,373 B2 * | 4/2008 | Hayashi et al. | .............. | 251/330 |
| 2003/0197141 A1 * | 10/2003 | Kajitani | ....................... | 251/122 |
| 2006/0284135 A1 * | 12/2006 | Hayashi et al. | .............. | 251/330 |

FOREIGN PATENT DOCUMENTS

| | | |
|---|---|---|
| JP | 08-285132 | 11/1996 |
| JP | 3005449 | 1/2000 |

* cited by examiner

*Primary Examiner*—John K Fristoe, Jr.
(74) *Attorney, Agent, or Firm*—Yokoi & Co., USA, Inc.

(57) ABSTRACT

The two-port valve comprises a main valve part which includes a valve seat disposed in the flow path, a valve element for opening and closing the flow path, and a rod coupled with the valve element and inserted into a through hole of a bonnet, and an operation part for driving the rod. The protection structure is provided in the two-port valve for protecting the rod seal member for the through hole from the fluid containing a depositional material. The protection structure includes ring-shaped abutting seal surfaces disposed in a wide area between a peripheral part of the valve element and an outer periphery of the rod for preventing the invasion of the fluid in a state of opening the valve. A ring-shaped elastic seal member is disposed on an inner end of the abutting seal surface.

6 Claims, 2 Drawing Sheets

PROTECTION STRUCTURE FOR ROD SEAL MEMBER OF TWO-PORT VALVE

The entire disclosure of Japanese Patent Application No. 2005-136208, filed May 9, 2005, is expressly incorporated by reference herein.

BACKGROUND OF THE INVENTION

1. Field of the Invention

The present invention relates to a protection structure for a rod seal member of a two-port valve, which may be used in a decompression port of a vacuum chamber for employing a process gas in a semiconductor manufacturing apparatus. More specifically, the invention is directed to a protection structure for a rod seal member which is configured to prevent adhesion of by-products from the process gas to a shaft seal member or the like.

2. Description of the Related Art

In semiconductor manufacturing apparatus or the like including a flow path through which a process gas flows, a two-port valve is used for reducing a pressure in a vacuum chamber or the like, and for opening and closing the flow path. In the flow path through which the process gas is passing, by-products may be deposited readily, and connected to a poppet-shaped valve element to adhere to a sliding part of a rod for driving the valve element, thereby inhibiting opening and closing operations of the valve element. For this reason, in order to disconnect the sliding part of the rod from a hydraulic fluid, the rod is set apart from the flow path by a bellows in the prior art.

The bellows, however, may come into contact with the process gas, causing the by-products to be deposited thereon. In recent years, the deposition of the by-products in the semiconductor manufacturing apparatus has become significant, thus inhibiting the operation of the valve element, leading to fixation and thus breakdown of the bellows (see JP-B No. 3005449).

Such a problem is common among devices having the flow path through which the process gas passes, as well as a vacuum flow path of the semiconductor manufacturing apparatus.

SUMMARY

The invention has been accomplished in order to solve the foregoing problem, and it is an object of the invention to provide a protection structure for a rod seal member of a two-port valve which can prevent the deposition of by-products from a process gas on a rod seal member thereby to protect sliding of the rod, without providing a bellows for preventing the invasion of a conducting fluid into the rod seal member.

In order to solve the foregoing problem, in one aspect of the invention, a protection structure for a rod seal member in a two-port valve is adapted for protecting the rod seal member from a fluid containing depositional material which passes through a flow path. The two-port valve includes a main valve part having first and second ports, a flow path connecting both the ports, a valve seat disposed in the flow path, a valve element for opening and closing the flow path by being brought into contact with or separated from the valve seat, and a rod coupled with the valve element. The two-port valve also includes an operation part which drives the rod for opening and closing the valve element. The rod is slidably inserted via the rod seal member into a through hole which penetrates a bonnet of the main valve part. Between a peripheral part of the valve element and an outer periphery of the rod, ring-shaped abutting seal surfaces are provided for preventing invasion of the fluid by abutting against each other in a state of opening the valve element, and a ring-shaped elastic seal member is disposed on an inner end of the abutting seal surface.

Preferably, in another aspect of the invention, the protection structure for a rod seal member further includes a return spring for pressing the valve element against the valve seat in the main valve part. The return spring is disposed between the bonnet and the periphery of the valve element, and the abutting seal surfaces are disposed between the peripheral part of the valve element in the vicinity of the return spring and the outer periphery of the rod.

In a further aspect of the invention, the abutting seal surfaces can be flat so as to be brought into surface contact with each other. The abutting seal surfaces may have grooves and protrusions fitted into each other, and alternately formed concentrically around the rod outside the elastic seal member, thereby providing a long penetration path for the fluid.

Furthermore, one of the abutting seal surfaces may have a flat surface outside the elastic seal member, whereas the other may have grooves concentrically formed around the rod to be abutted against the flat surface. With this arrangement, the abutting seal surfaces have an effect of preventing the invasion of fluid, while acting as the so-called labyrinth, and protrusions formed between the grooves serve to break the by-products deposited on an opposite side.

In any one of the above-mentioned structures, a second ring-shaped elastic seal member may be provided outside the elastic seal member on the inner end.

According to the invention as described above, the deposition of by-products due to the process gas on the rod seal member can be prevented to protect the sliding of the rod, without providing the bellows for prevention of the invasion of the conducting fluid into the rod seal member.

DESCRIPTION OF THE PREFERRED EMBODIMENTS

Reference will now be made in detail to a two-port valve including a protection structure for a rod seal member according to some embodiments of the invention, which are illustrated in the accompanying drawings.

Figure 1:
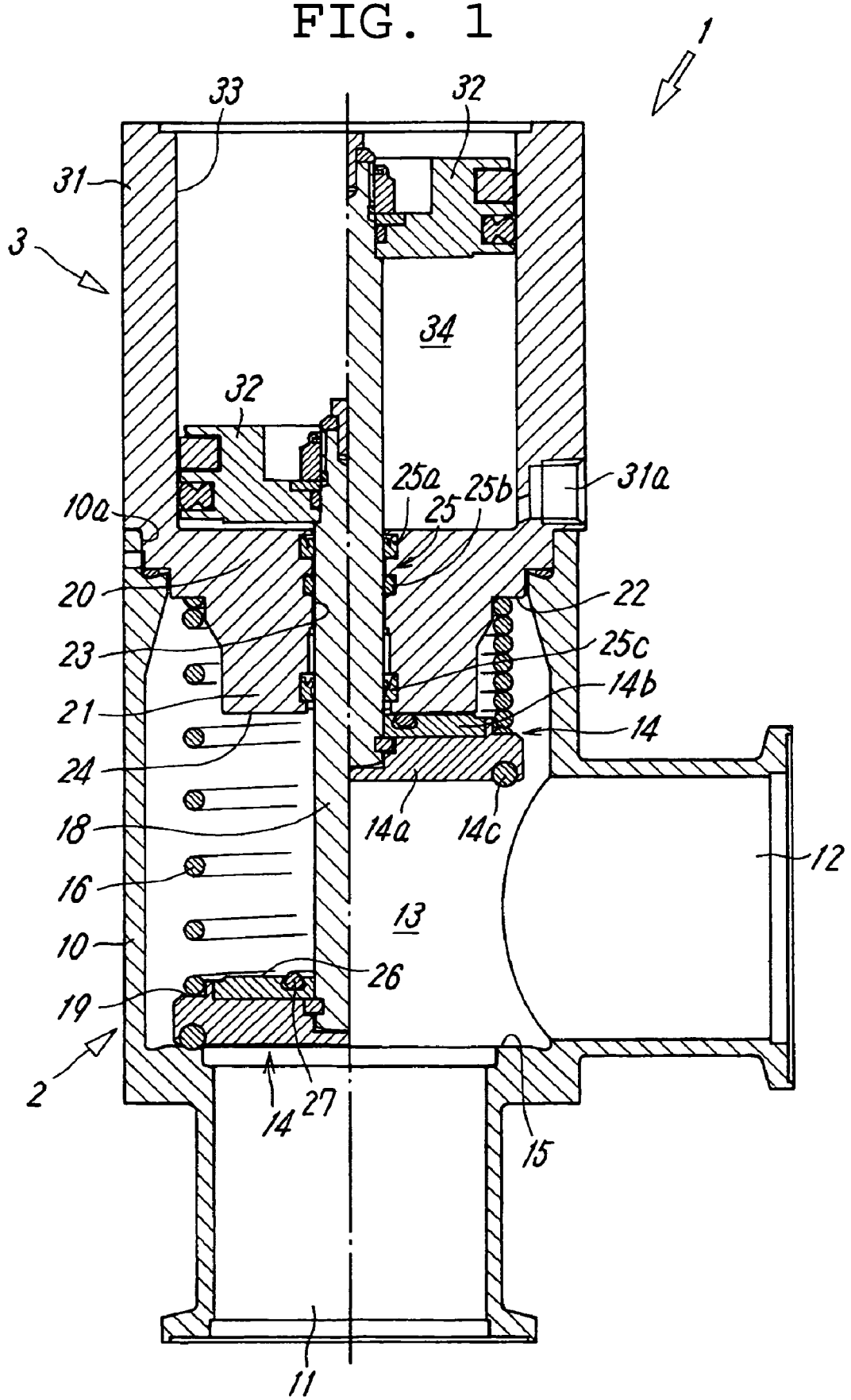
FIG. 1 is a longitudinal sectional view of a two-port valve which allows for application of a protection structure for a rod seal member according to a first embodiment of the invention.
Figure 2:
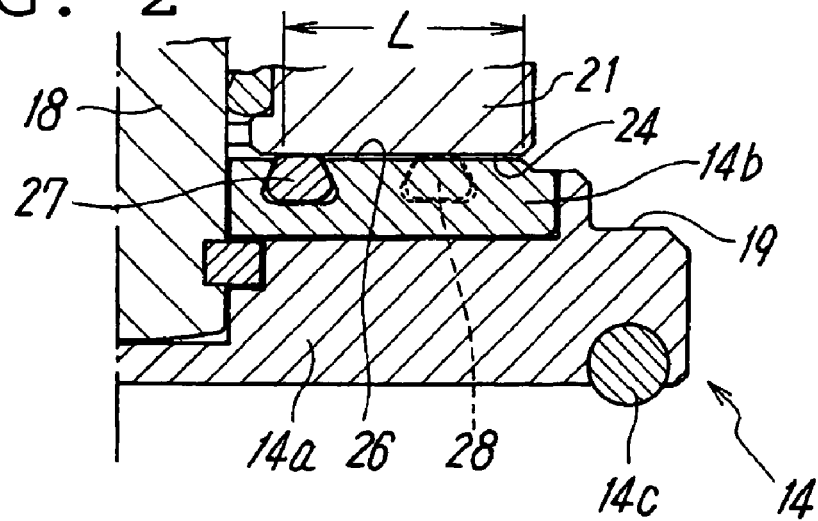
FIG. 2 is a partially enlarged sectional view of a main part of a valve element of FIG. 1.

In a first embodiment of the invention as shown in FIGS. 1 and 2, a protection structure for a rod seal member according to the first embodiment is applied to an example of a two-port valve which is disposed in a flow path between a vacuum chamber used for a chemical treatment, such as etching in a semiconductor manufacturing apparatus, and a vacuum pump for decompression.

Referring to FIG. 1, the two-port valve of the first embodiment includes a main valve part 2 having a valve body 10 which is provided with a first port 11 connected to a vacuum chamber not shown, a second port 12 connected to a vacuum pump not shown, and a flow path 13 connecting both the ports 11 and 12. The main valve part 2 is configured to open and close the flow path 13 by a valve element 14. The two-port valve also includes an operation part 3 having means for driving the valve element 14 for the opening and closing of the flow path.

In the left half part of FIG. 1 with respect to a center axis thereof, the flow path 13 is closed with the valve element 14, while in the right half part thereof, the flow path 13 is opened with the element.

In the main valve part 2, the valve body 10 made of stainless steel (SUS) or the like is opened such that the first port 11 and the second port 12 are arranged in a direction to form a right angle therebetween. The L-shaped flow path 13 is formed between these ports. A valve seat 15 is provided on the first port 11 side of the flow path 13. The valve body 10 is also provided therein with the poppet-shaped valve element 14 which is brought into contact with and separated from the valve seat 15, and with a return spring 16 serving as means for driving the valve element 14 in a direction to press the valve element 14 against the valve seat 15, or in a direction to close the valve.

On an opposite side of the valve body 10 with respect to the first port 11, an open part 10a is provided for contiguously forming an operation part body 31 of the operation part 3. Around a peripheral wall surrounding the open part 10a, a bonnet 20 of the valve body 10 constituting the bottom of the operation part body 31 of the operation part 3 is disposed in a closely-fitted state via a seal member.

The valve element 14 is composed of a disc-like main member 14a, and a disc-like sub-member 14b fitted into a circular pit of the main member 14a on a side of the bonnet 20, and opposed to a circular stand 21 of the bonnet 20. To an outer peripheral part of a valve-seat-facing side of the main member 14a, is attached a ring-shaped seal member 14c made of an elastic material. The ring-shaped seal member 14c is brought into contact with and separated from the valve seat 15.

The bonnet 20 surrounds the circular stand 21 which is located at the center of the flow path 13, and is provided with a spring seat 22 for the return spring 16 formed in a stepwise manner in a narrow area between the inner wall of the valve body 10 and the bonnet 20.

A through hole 23 penetrating the bonnet 20 is disposed at the center part of the bonnet 20. A rod 18 for driving the valve element 14 is slidably inserted into the through hole 23 via a rod seal member 25 disposed on an inner surface of the through hole 23, and has its tip end connected to the valve member 14. The rod seal member 25 is composed of a first seal member 25a disposed in the vicinity of an end of the through hole 23 on the operation part 3 side, a second seal member 25b disposed on the valve element side, and a scraper 25c disposed in the vicinity of an end of the through hole 23 on the valve element side.

The return spring 16 is provided between a spring seat 19 formed in a stepwise manner on an outer peripheral part of the main member 14a of the valve element 14, and the spring seat 22 of the bonnet 20 positioned opposed to the spring seat 19. The return spring 16 is compressed so as to press the valve element 14 against the valve seat 15. The return spring 16 can be compressed in such a state that an abutting seal surface 24 located on a top of the circular stand 21 of the bonnet 20 is pressed against an abutting seal surface 26 of the sub-member 14b of the valve element 14, opposed to the abutting seal surface 24 upon opening the valve (see the right half part of FIG. 1).

The abutting seal surface 26 is provided in a wide area between the spring seat 19 disposed around the valve element 14 and the rod 18. This increases a seal effect as much as possible, as described later.

FIG. 2 is an enlarged diagram of an abutting state of the abutting seal surfaces 24 and 26. In this abutting state, the abutting seal surface 26 of the sub-member 14b which becomes flatten in the compression state of the return spring 16 is abutted against the abutting seal surface 24 of the circular stand 21 of the bonnet 20 which becomes flatten in the same way as the above. Both abutting seal surfaces 24 and 26 are brought into surface contact with each other in the compression state of the return spring 16 to form a ring-shaped seal surface. These abutting seal surfaces 24 and 26 are provided in a wide area from a peripheral part of the valve element 14 in the vicinity of the spring seat 19 positioned on the periphery of the valve element 14 to the outer periphery of the rod 18. A ring-shaped elastic seal member 27 consisting of an O ring is embedded into an inner end of the abutting seal surface 26 adjacent to the rod, for sealing between the abutting seal surface 26 and the abutting seal surface 24 of the bonnet 20.

In this state, a fluid containing depositional materials and passing through the flow path 13 is securely sealed with the elastic seal member 27. Furthermore, the fluid can be prevented as much as possible from entering the rod seal member 25 because a length L from the elastic seal member 27 to an outer part of the abutting seal surface 26 is as large as possible, as the abutting seal surface allows.

Also, the abutting seal surface 26 may be provided with a second elastic seal member 28 outside the elastic seal member 27, as illustrated by a broken line in FIG. 2. This can improve further the seal effect for preventing the invasion of the fluid into the rod seal member 25.

The operation part 3 shown in FIG. 1 uses a hydraulic cylinder as valve opening means for driving the valve element 14 in a direction of opening the valve so as to operate the cylinder by compressed air.

The hydraulic cylinder includes the operation part body 31 integrally formed with the bonnet 20. A piston 32 coupled with the rod 18 is slidably fitted into a cylinder hole 33 formed within the operation part body 31 to form a pressure chamber 34 on a driving-pressure supply side (bonnet 20 side) of the piston 32 in the cylinder hole 33. In the pressure chamber 34, a pilot port 31a is provided opened for supplying and exhausting the compressed air.

In the two-port valve 1 thus arranged as shown in the left half part of FIG. 1, the valve element 14 is first pressed against the valve seat 15 to close the flow path 13. After this state, when the compressed air is supplied to the pressure chamber 34 to drive the piston 32, the flow path 13 is opened by the valve element 14 via the rod 18. The valve element 14 compresses the return spring 16, while being driven towards the bonnet, so that the valve element is abutted against the bonnet 20. In this state, the elastic seal member 27 of the valve element 14 is brought into intimate contact with the abutting seal surface 24 of the circular stand 21 of the bonnet 20, while the abutting seal surface 26 of the sub-member 14b is brought into surface contact with the abutting seal surface 24 of the bonnet 20 to seal therebetween, thereby preventing the fluid in the flow path 13 from reaching the elastic seal member 27. As a result, while the flow path 13 is being opened by the valve element 14, the abutting seal surfaces 24 and 26 can prevent the fluid passing through the flow path 13 and containing the depositional material from entering the rod seal member 25 as much as possible.

When the compressed air in the pressure chamber 34 is exhausted, the piston 32 is driven towards the bonnet by an urging force of the return spring 16, while the valve element 14 is driven towards the valve seat 15 via the rod 18, finally causing the valve element to be pressed against the valve seat 15. In this case, since the rod seal member 25 is protected from the invasion of the fluid containing the depositional material, the rod 18 can be slid smoothly within the through hole 23. In this state, the abutting seal surfaces 24 and 26 are released from the abutting state and exposed to the flow path 13. In this stage, the fluid does not pass through the flow path 13, and hence there is no need for protecting the rod seal member 25 from deposition of the by-products.

Figure 3:
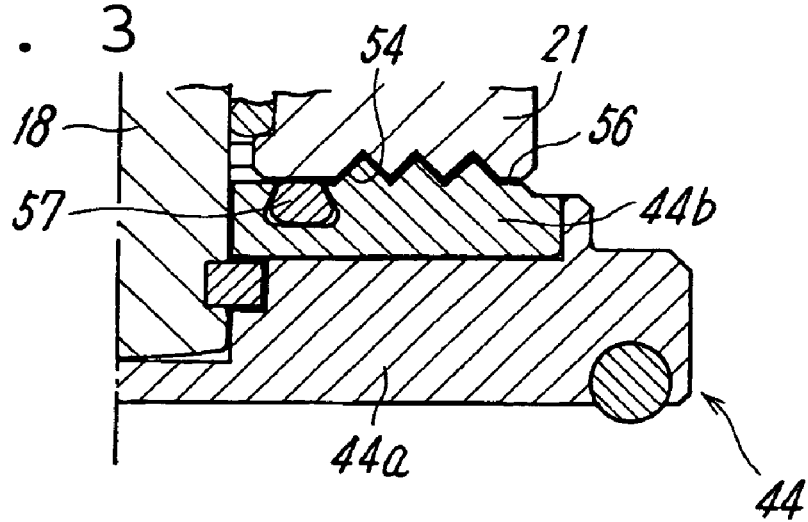
FIG. 3 is a partially enlarged sectional view of a main part similar to that of FIG. 2 according to a second embodiment of the invention.

Now, referring to FIG. 3, a protection structure for the rod seal member in the two-port valve according to a second preferred embodiment of the invention will be described in detail.

The second embodiment is the same as the first embodiment, except for the structure of the abutting seal surfaces. Thus, only the structure of the different part will be described below, and a description of the structure of the same part as the first embodiment will be omitted.

A valve element 44 of the second embodiment includes a main member 44a and a sub-member 44b, as is the case with the first embodiment. The same elastic seal member 57 as that of the first embodiment is disposed on an inner end of an abutting seal surface 56 of the sub-member 44b. The abutting seal surface 56 located outside the seal member, and an abutting seal surface 54 of the circular stand 21 of the bonnet 20 have grooves and protrusions fitted into one another and alternately formed concentrically around the rod 18.

The abutting seal surfaces 54 and 56 as thus arranged have a long penetration path for the fluid, and thus can prevent the invasion of the fluid containing the depositional material effectively, as compared to the flat abutting seal surfaces of the first embodiment.

Figure 4:
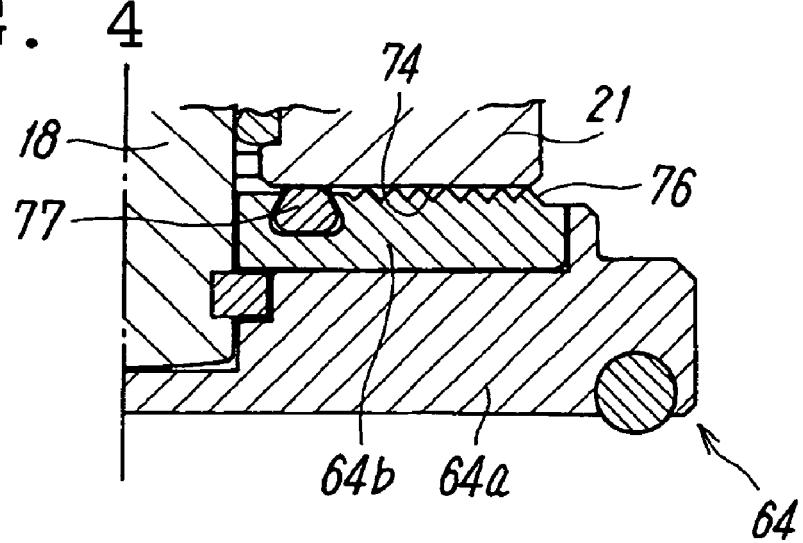
FIG. 4 is a partially enlarged sectional view of a main part similar to that of FIG. 2 according to a third embodiment of the invention.

FIG. 4 illustrates a protection structure for the rod seal member according to a third preferred embodiment of the invention. The third embodiment is the same as the first embodiment, except for the structure of the abutting seal surfaces. Thus, only the structure of the different structure will be described below, and a description of the structure of the same part will be omitted.

A valve element 64 of the third preferred embodiment includes a main member 64a and a sub-member 64b, as is the case with the first embodiment. The same elastic seal member 77 as that of the first embodiment is provided on an inner end of an abutting seal surface 76 of the sub-member 64b. The abutting seal surface 76 located outside the seal member has a number of grooves concentrically formed around the rod 18, whereas an abutting seal surface 74 of the circular stand 21 of the bonnet 20 is so flat that protrusions between the grooves on the seal surface 76 may be abutted against the seal surface 74.

In the abutting seal surfaces 74 and 76 thus arranged, the protrusions formed between the grooves serve to break by-products deposited on the abutting seal surface 74 effectively, as compared to the abutting seal surface of the first embodiment.

Although the preferred embodiments of the invention have been explained in the above description, the invention is not limited to the embodiments described above. Thus, those skilled in the art will appreciate that various modifications can be made to the presently disclosed embodiments without departing from the scope of the appended claims.

For example, the above-mentioned two-port valve to which the protection structure for the rod seal member of the invention is applied comprises the return spring 16 in the main valve part 2 for pressing the valve element 14 against the valve seat 15 to close the valve, wherein in opening the valve, the compressed air is supplied to the pressure chamber 34 to drive the piston 32. The invention is not limited thereto. Both opening and closing of the valve element 14 may be carried out by the compressed air, or by other means, for example, manually.

Furthermore, although in each of the first to third embodiments, the elastic seal. member of the abutting seal surface is disposed on the sub-member of the valve element, it may be disposed on the abutting seal surface of the bonnet. The second elastic seal member explained in the first embodiment can also be provided in the second and third embodiments. Moreover, if necessary, another or other elastic seal members can be provided in each embodiment.

The operation part for driving the valve element is not limited to the driving part by the compressed air, but may be a driving device for driving the valve element manually, or any other appropriate driving device

What is claimed is:

1. A protection structure for a rod seal member, comprising:
    a valve having a main valve part, including:
    a first port parallel along a longitudinal axis of the valve;
    a second port substantially perpendicular to the longitudinal axis of the valve; and
    a flow path for fluid flow between the first port and the second port when a valve element opens the first port;
    a rod for driving the valve element to one of closed and open positions by slidably moving within a through hole disposed longitudinally at a center part of a bonnet via the rod seal member;
    the valve element disposed between the rod seal member and the flow path, includes:
    a main member comprised of a substantially circular disc, having:
    a first side that includes:
    a center coupled with an end of the rod;
    the first side having a stepwise increase in height, a radial distant away from the center;
    a flange at a proximate radial distal end on the first side;
    a recess delimited with the flange at a radial distal end of the recess and a final increased stepwise height at a radial proximal end of the recess;
    a substantially flat second side that abuts a valve seat, and includes a ring seal member housed within a first groove located at a radial distal end of the second side;
    a sub-member housed within the recess for providing added protection for the rod seal member from the flow path, the sub-member is comprised of:
    a substantially circular disc with a circular central hole at a sub-member center for inserting and coupling the end of the rod with the center;
    a first abutting seal surface that includes a second groove, proximal around the sub-member center for housing an elastic seal member;
    the first abutting seal surface, including the elastic seal member abut against a second abutting seal surface of the bonnet for sealing off fluid flows from the path flow reaching the rod seal member.

2. The protection structure for a rod seal member according to claim 1, further comprising a return spring for pressing the valve element against the valve seat in the main valve part
    the return spring is disposed between the bonnet and a periphery of the valve element, and the first abutting seal surface and the second abutting seal surface are disposed between the peripheral part of the valve element near the return spring and an outer periphery of the rod.

3. The protection structure for a rod seal member according to claim 1, wherein a second ring seal member is disposed at a distance from the sub-member center.

4. The protection structure for a rod seal member according to claim 1, wherein said first abutting seal surface and the second abutting seal surface are flat.

5. The protection structure for a rod seal member according to claim 1, wherein said first abutting seal surface and said second abutting seal surface include complementary, radial surface treatments with alternative, concentric arrangement of grooves and protrusions on surfaces of said first abutting seal surface and said second abutting seal surface, a radial distance away from radial outer edge of the second groove.

6. The protection structure for a rod seal member according to claim 1, wherein one of the first abutting seal surface and the second abutting seal surface has a flat surface, and the other of the first abutting seal surface and the second abutting seal surface has radial serrations.

* * * * *